(12) United States Patent
Kriaa et al.

(10) Patent No.: US 12,549,567 B2
(45) Date of Patent: Feb. 10, 2026

(54) DEVICE AND METHOD FOR GENERATING A RESPONSE TO AN ATTACK IN A COMMUNICATION NETWORK USING MACHINE LEARNING

(71) Applicant: Nokia Technologies Oy, Espoo (FI)

(72) Inventors: Siwar Kriaa, Antony (FR); Afef Feki, Sceaux (FR); Arunkumar Halebid, Bangalore (IN); Serge Papillon, Paris (FR)

(73) Assignee: Nokia Technologies Oy, Espoo (FI)

( * ) Notice: Subject to any disclaimer, the term of this patent is extended or adjusted under 35 U.S.C. 154(b) by 336 days.

(21) Appl. No.: 18/284,173

(22) PCT Filed: Mar. 31, 2021

(86) PCT No.: PCT/EP2021/058438
§ 371 (c)(1),
(2) Date: Sep. 26, 2023

(87) PCT Pub. No.: WO2022/207093
PCT Pub. Date: Oct. 6, 2022

(65) Prior Publication Data
US 2024/0048570 A1  Feb. 8, 2024

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01)

(58) Field of Classification Search
CPC ................. H04L 63/1416; H04L 41/16; H04L 2463/142; H04L 2463/144; H04L 63/1458; H04W 12/122
See application file for complete search history.

(56) References Cited

U.S. PATENT DOCUMENTS

| | | | |
|---|---|---|---|
| 12,443,574 B1* | 10/2025 | Kulshreshtha | G06F 16/215 |
| 12,443,756 B1* | 10/2025 | Altekar | G06F 16/986 |
| 2010/0082513 A1* | 4/2010 | Liu | H04L 63/1458 706/46 |
| 2015/0195145 A1* | 7/2015 | Di Pietro | H04L 47/41 706/12 |
| 2019/0182274 A1* | 6/2019 | Doron | G06N 3/0464 |
| 2021/0092140 A1* | 3/2021 | Kazerounian | H04L 63/1483 |
| 2022/0038494 A1* | 2/2022 | Reddy | G06N 20/00 |
| 2022/0092177 A1* | 3/2022 | Herwono | G06F 21/562 |
| 2022/0150268 A1* | 5/2022 | Herwono | G06F 21/552 |

FOREIGN PATENT DOCUMENTS

| | | | |
|---|---|---|---|
| CN | 111177417 A | | 5/2020 |
| CN | 111885000 A | * | 11/2020 |

* cited by examiner

Primary Examiner — Aftab N. Khan
(74) Attorney, Agent, or Firm — McCarter & English LLP

(57) ABSTRACT

In a communication network, a device is configured to predict attacks and detect attacks from data logs received from the network and generate a response to an attack upon prediction or detection of an attack. Graph representations of data logs are generated based on a predefined schema. Attacks are detected by applying inference rules to a graph representation of the data logs. Attacks are predicted by using a graph neural network trained with subgraphs obtained by querying a graph representation of training data corresponding to normal traffic and attacks.

13 Claims, 5 Drawing Sheets

DEVICE AND METHOD FOR GENERATING A RESPONSE TO AN ATTACK IN A COMMUNICATION NETWORK USING MACHINE LEARNING

CROSS REFERENCE TO RELATED APPLICATION

This patent application is a U.S. National Stage application of International Patent Application Number PCT/EP2021/058438 filed Mar. 31, 2021, which is hereby incorporated by reference in its entirety.

TECHNICAL FIELD

Various example embodiments relate generally to devices and methods for use in a communication network to handle security threats.

BACKGROUND

Security in networks is a key issue and a real differentiator, crucial to get the full benefit of the capabilities and services offered by the new generations of networks, for example 5G networks.

For example the proliferation of IOT (Internet Of Things) devices in 5G brings critical importance to the security of networks. A major area of security threats due to IOT traffic in 5G RAN (Radio Access Network) and Core networks is known as "Distributed Denial of Service" (DDOS) or "botnet" attacks: vulnerable IOT devices are infected by a malware and form an army of bots, controlled by an attacker, that are induced to overload the targeted network/resources, resulting in DDOS to regular service traffic.

Conventional solutions to secure exchanges at the RAN level are based on intrusion detection mechanisms. They are not sufficient to respond to the Quality of Service (QoS) requirements specified for 5G networks.

Other security solutions are based on behavioral analysis. They produce a high rate of false positives which renders them less attractive and trustworthy.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

According to a first aspect, a device for generating a response to an attack in a communication network is disclosed, which comprises at least one processor and at least one memory including computer program code, the at least one memory and the computer program code being configured to, with the at least one processor, cause the device at least to generate a graph representation of network data received from the communication network, based on a predefined schema, predict attacks from the received data based on the graph representation by using a graph neural network trained with subgraphs representing candidate attacks, detect attacks from the received data by applying inference rules to the graph representation, launch an attack response upon prediction of an attack or upon detection of an attack.

According to an embodiment the device is further configured to obtain a prediction confidence level by comparing the result of predicting the attack and the result of detecting the attack, wherein the attack response is launched upon prediction of an attack depending on the prediction confidence level.

According to another embodiment, the device is further configured to train the graph neural network.

According to another embodiment, the device is further configured to trigger training of the graph neural network based on the prediction confidence level.

According to another embodiment, the device is further configured to trigger an update of the inference rules when a confirmed attack was predicted and was not detected.

According to another embodiment, the device is further configured to determine a time difference between predicting the attack and detecting the attack, wherein the attack response is launched upon prediction of an attack depending on said time difference.

According to a second aspect, a method for generating a response to an attack in a communication network is disclosed which comprises generating a graph representation of network data received from the communication network, based on a predefined schema, predicting attacks from the received data based on the graph representation by using a graph neural network trained with subgraphs representing candidate attacks, detecting attacks from the received data by applying inference rules to the graph representation, launching an attack response upon prediction of an attack or upon detection of an attack.

According to an embodiment the method further comprises obtaining a prediction confidence level by comparing the result of predicting the attack and the result of detecting the attack, wherein the attack response is launched upon prediction of an attack depending on the prediction confidence level.

According to an embodiment the method further comprises triggering training of the graph neural network based on the prediction confidence level.

According to an embodiment, the method further comprises triggering an update of the inference rules when a confirmed attack was predicted and was not detected.

According to another embodiment, the method further comprises determining a time difference between predicting the attack and detecting the attack, wherein the attack response is launched upon prediction of an attack depending on said time difference.

In another embodiment of the disclosed device and method, the subgraphs used for training the graph neural network are obtained by querying a graph representation of training data wherein the training data include attacks and the graph representation of training data is generated based on the predefined schema.

According to another embodiment of the disclosed device and method, the inference rules infer presence of a type of attack in the graph representation and different prediction confidence levels are obtained for different types of attacks.

According to another embodiment of the disclosed device and method, the inference rules infer presence of a type of attack in the graph representation and different time differences are obtained for different types of attacks.

According to another embodiment of the disclosed device and method, the graph neural network is a convolutional graph neural network According to a third aspect, a radio intelligent controller is disclosed for use in a radio access network, the radio intelligent controller comprising a device for generating a response to an attack in a communication network as disclosed herein, wherein the data are received from at least one base station in the radio access network.

According to a fourth aspect, a computer program product is disclosed which comprises a set of instructions which, when executed on a device, is configured to cause the device to carry out a method for generating a response to an attack in a communication network as disclosed herein.

Generally, the device comprises means for performing one or more or all steps of a method for generating an attack response in a communication network as disclosed herein. The means may include circuitry configured to perform one or more or all steps of the method for generating an attack response in a communication network as disclosed herein. The means may include at least one processor and at least one memory including computer program code, wherein the at least one memory and the computer program code are configured to, with the at least one processor, cause the device to perform one or more or all steps of the method for generating an attack response in a communication network as disclosed herein.

Generally, the computer-executable instructions/program code cause the device to perform one or more or all steps of a method for generating an attack response in a communication network as disclosed herein.

BRIEF DESCRIPTION OF THE DRAWINGS

Example embodiments will become more fully understood from the detailed description given herein below and the accompanying drawings, which are given by way of illustration only and thus are not limiting of this disclosure.

Figure 1:
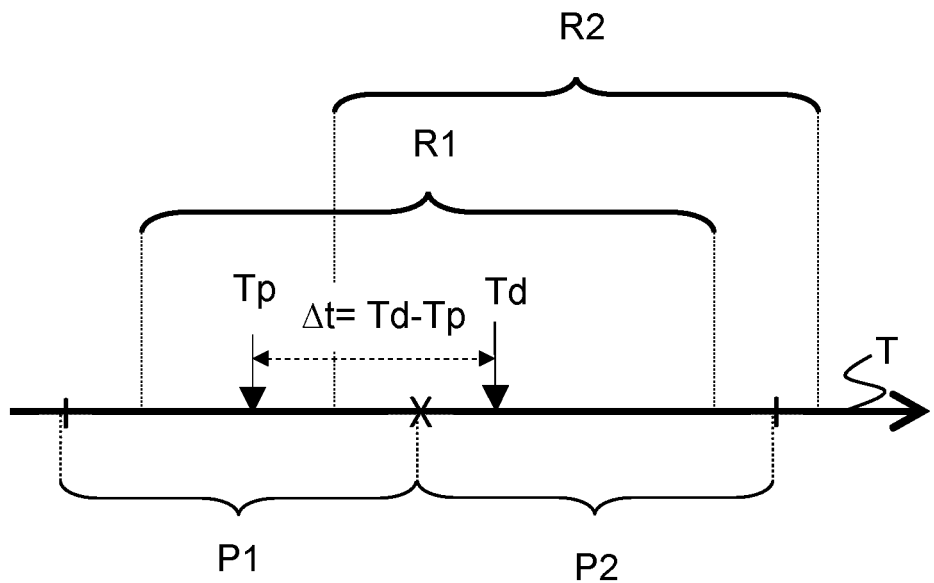
FIG. 1 is a schematic representation of an exemplary attack timeline.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed example embodiments are disclosed herein. However, specific structural and functional details disclosed herein are merely representative for purposes of describing example embodiments. The example embodiments may, however, be embodied in many alternate forms and should not be construed as limited to only the embodiments set forth herein. Accordingly, while example embodiments are capable of various modifications and alternative forms, the embodiments are shown by way of example in the drawings and will be described herein in detail. It should be understood, however, that there is no intent to limit example embodiments to the particular forms disclosed.

To improve the processing of security attacks in networks, the disclosed device and method involve prediction and detection of attacks.

FIG. 1 is a representation of an exemplary attack timeline T. The attack comprises an attack preparation phase P1 and an attack execution phase P2. During the attack preparation phase some steps are taken by an attacker but no harm has been done yet. In the attack execution phase some detrimental events are happening. The objective of the prediction is to identify an ongoing attack proactively at an early stage of the attack, during the attack preparation phase P1 or in the early stage of the attack execution stage P2, whereas the attack is actually detected at a later stage during the attack execution phase P2, sometimes after the damage has already occurred in the network. The objective of the prediction is to launch an attack response proactively in order to avoid the impact of the attack. Launching an attack response rapidly allows to minimize the harmful impact of the attack on the overall network performance. A response can involve blacklisting equipment, bar admissions, deny data services, etc. . . . or a combination of such actions.

The timeline T includes an attack prediction range R1 and an attack detection range R2. In the example of FIG. 1 the attack prevision range R1 and the attack detection range R2 are overlapping. A prevision of an attack takes place at time Tp and a detection of the attack takes place at time Td. The time difference between predicting the attack and detecting the attack is noted $\Delta t = Td - Tp$.

Prediction and detection use network data received from the network. The network data provide information on the network for example network traffic, usage, conditions, etc. . . . The network data are also called event logs or data logs.

In a specific example, network data are collected by the disclosed device from one or more base stations in a core network of a mobile communication system.

To run prediction and detection, the disclosed device and method involve a schema A built offline by network or security experts during a configuration phase prior to exploitation. This schema A is used to generate graph representations of the network data, also called knowledge graphs. The schema A captures the different concepts of interest in the network data, which are modelled by nodes, and the relationships between these concepts, which are modelled by vertices. For example the concepts can be events and processes. The relationships can be an action, for instance an action of a first process creating a second process.

In addition to the schema A, the experts also define inference rules B to be used for attack detection. The inference rules infer the presence of certain types of attacks when certain conditions are fulfilled. These rules use the same syntax of nodes and relationships as defined in the schema in order to be compliant with the schema. They are stored in a database in the device.

Prediction uses a graph neural network GNN trained during the configuration phase by using training data corresponding to normal traffic and attacks. In an embodiment the graph neural network GNN is a convolutional neural network. However other types of neural network may be used.

Figure 2:
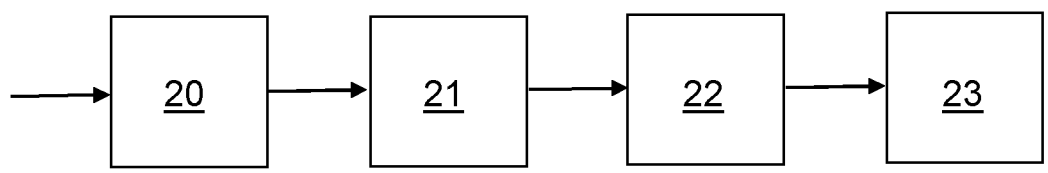
FIG. 2 is a flowchart illustrating an exemplary embodiment of training a graph neural network for use in the disclosed device or method.

FIG. 2 is a flowchart describing the training of the graph neural network GNN. At step 20 a graph representation of the training data, also referred to as training graph, is generated based on the schema. The training graph comprises nodes labelled as attack nodes and relationships labelled as attack relationships. Labels are obtained through detection, i.e. by applying the inference rules B. At step 21, the training graph is queried by using querying rules to obtain subgraphs forming a labelled training set. At step 22, the graph neural network is trained with the labelled training set. At step 23 training terminates. The trained graph neural network obtained from training constitutes a prediction model C which will be used during the exploitation phase to predict attacks.

In an exemplary embodiment, the querying rules are designed to define notions of candidate and neighboring nodes as well as candidate and neighboring relationships and to extract subgraphs based on these notions. The extracted subgraphs comprise subgraphs corresponding to candidate attack nodes, subgraphs corresponding to the k-hop neighboring nodes of candidate attacks nodes (where k is an integer) and subgraphs corresponding to the neighboring nodes of attack nodes. The subgraphs include nodes and relationships constituting the features to be learned by the graph neural network.

Figure 3:
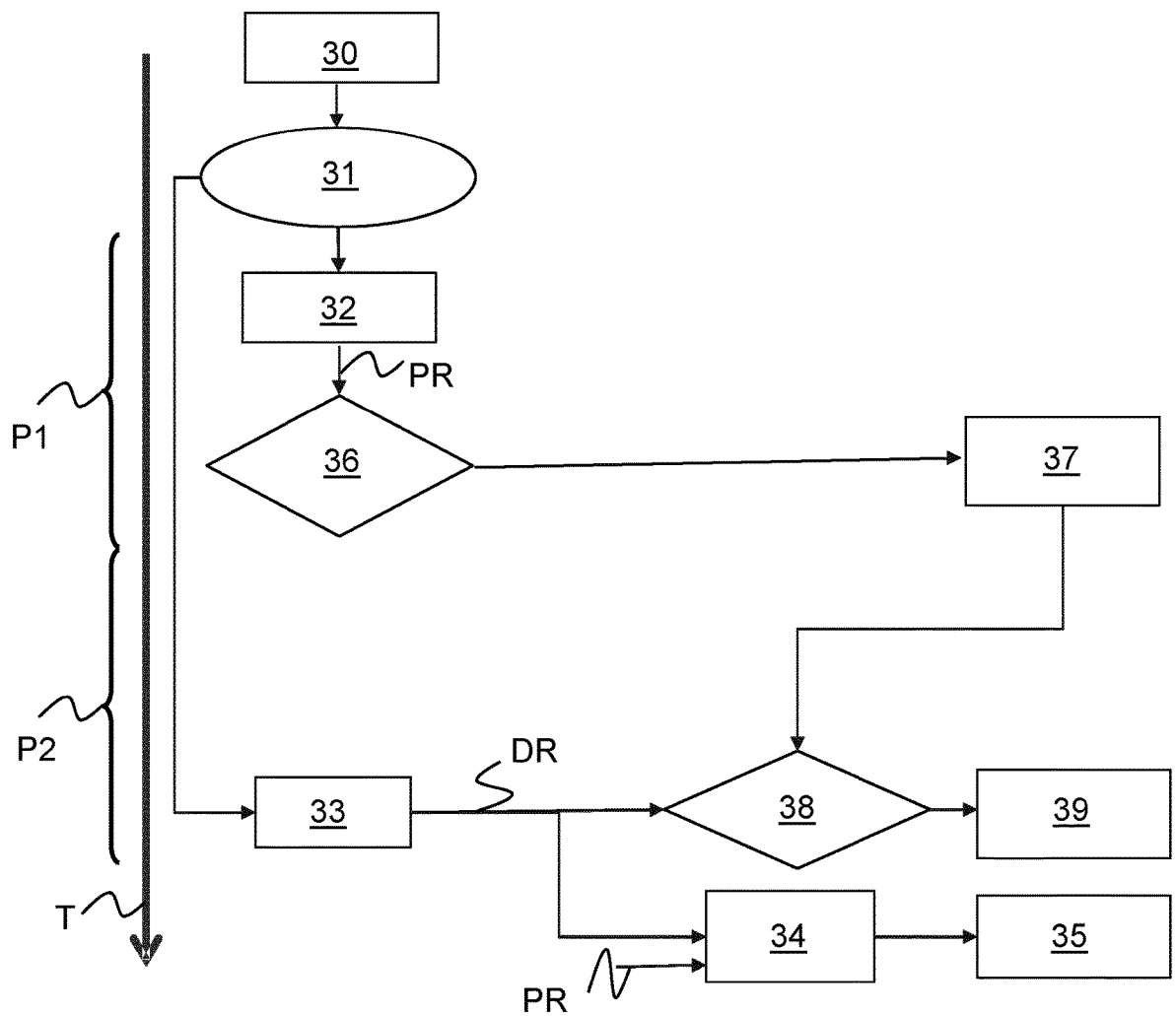
FIG. 3 is a flowchart illustrating an exemplary embodiment of a method for generating a response to an attack in a communication network.

FIG. 3 is a flowchart illustrating an exemplary embodiment of a method for generating a response to an attack in a communication network. The method of FIG. 3 is implemented during the exploitation phase. It involves prediction using the trained model C and detection using the inference rules B.

At step 30 network data are received by the device from the communication network. At step 31, a graph representation of the network data A1, also referred to as network data graph, is generated based on the schema A which was preconfigured during the configuration phase. The network data graph is an instantiation of the schema A.

At step 32 attacks are predicted by running the prediction model C on the network data graph A1. In other words the network data graph A1 is applied to the graph neural network GNN to predict attacks. Step 32 provides a prediction result PR. Step 32 takes place during the attack preparation phase P1.

At step 33 the inference rules B are applied to the network data graph A1 for attack detection. Step 33 provides a detection result DR. Step 33 takes place during the attack execution phase P2.

At step 34, a consistency checking is done by comparing the result of the prediction PR and the result of the detection DR. As a result of the consistency checking, a confidence level L is estimated at step 35. In an embodiment the confidence level is determined per type of attacks.

At step 36, upon prediction of an attack, that is when the result PR of the prediction indicates the presence an attack, the confidence level is checked. If the confidence level is satisfactory, for example if it is higher than a certain value, an attack response is launched at step 37. In this case the attack response is referred to as proactive attack response.

At step 38, upon detection of an attack, that is when the result DR of the detection indicates the presence of an attack, a check is made whether a proactive attack response has already been launched. At step 39, when no proactive attack response has been launched, an attack response is launched. In this case the attack response is referred to a reactive attack response.

In this embodiment an attack response is launched upon prediction of an attack if the confidence level of the prediction is high enough or upon detection of the attack if the confidence level of the prediction is not high enough.

Figure 4:
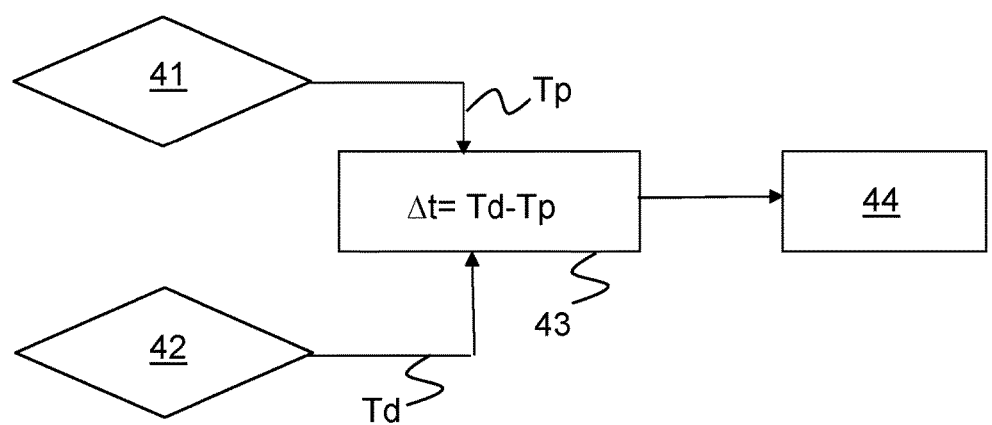
FIG. 4 is a flowchart illustrating another exemplary embodiment of a method for generating a response to an attack in a communication network.

FIG. 4 is a flowchart of another exemplary embodiment of a method for generating a response to an attack in a communication network.

In the embodiment illustrated in FIG. 4, when the detection and prediction are consistent, that is if the same attack is first predicted at step 41 and subsequently detected at step 42, a timestamp of the prediction Tp and a timestamp of the detection Td are stored at step 43. In an embodiment they are stored in relation with the attack type. This is used to evaluate the average prediction time before detection per attack type. If the time difference $\Delta t = Td - Tp$ is long enough for a proactive response to be effective in the time frame $\Delta t$, a proactive attack response is launched at step 44. Otherwise, no proactive attack response is launched.

The embodiments described in relation to FIG. 3 and FIG. 4 can be combined so that a proactive response is launched only if, for the particular attack type, the prediction confidence level is satisfactory and the time difference between prediction and detection is long enough for the proactive response to be effective in the time interval $\Delta t$. This allows to determine the efficiency and effectiveness of the prediction and launch a proactive attack response only when appropriate. The level of efficiency and effectiveness of the prediction may vary depending on the type of the attack. Therefore determining the prediction confidence level and the time interval between prediction and detection by type of attacks allows to enhance performances.

Figure 5:
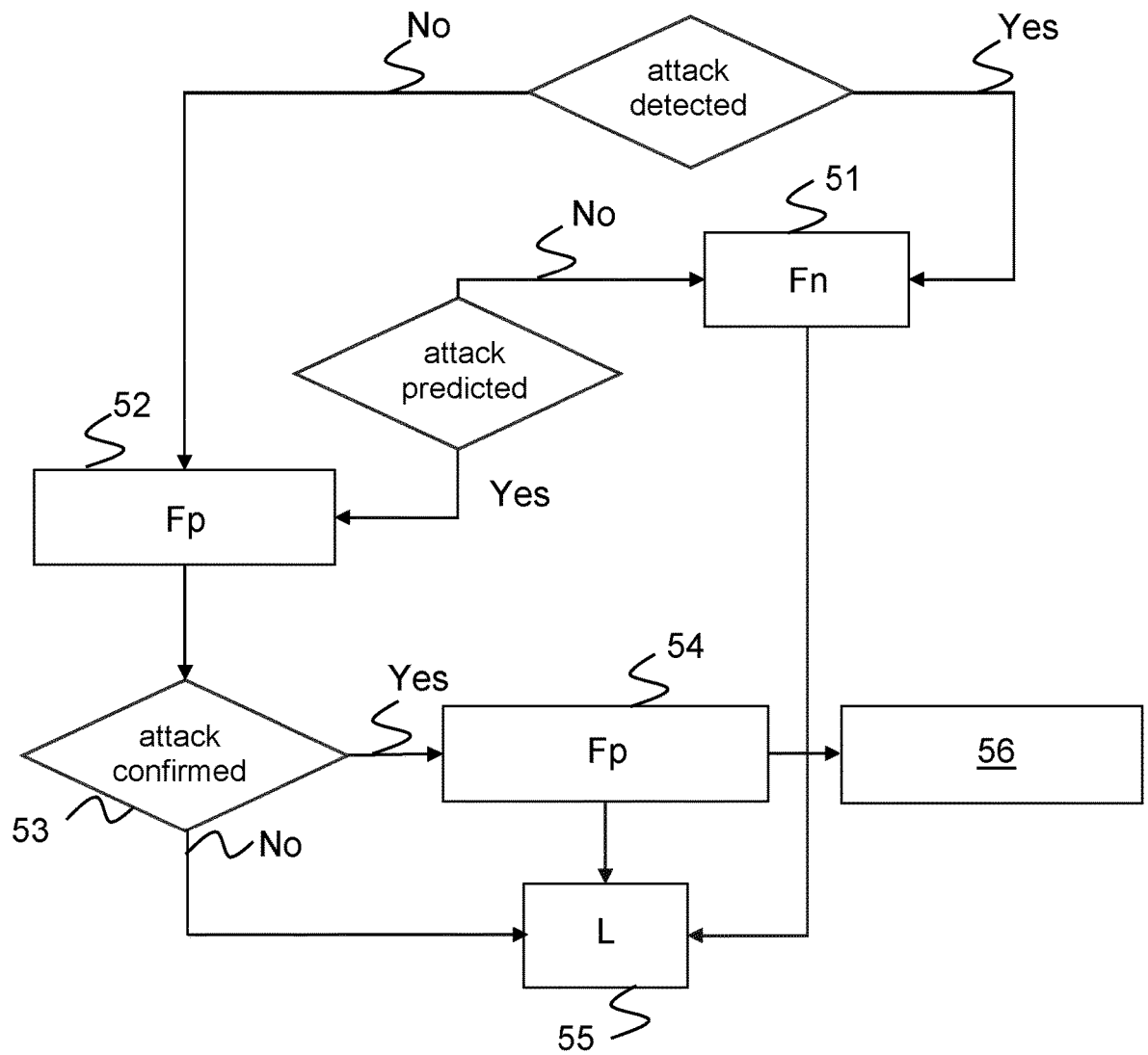
FIG. 5 is a flowchart of an exemplary embodiment of consistency checking for use in a device or method for generating a response to an attack in a communication network.

FIG. 5 is a flow chart describing consistency checking as disclosed in relation to FIG. 3, specifically the determination of the prediction confidence level. This determination is based on two rates: a false positive rate Fp and a false negative rate Fn.

At step 51, when an attack is detected that hasn't been predicted, the false negative rate Fn is updated.

An attack which is predicted and not detected, could be: a false positive, or a start of an attack not coming to an end (for example because of a security measure or because of a non persistent attacker), or a real attack that is currently not detected but is sufficiently similar to a known attack to trigger the prediction, in which case, it is possible that a further detection (either on a further step of attack or on a post mortem analysis) will tell that the prediction was right, enabling not to count the prediction result PR as a false positive.

When an attack is predicted and not detected, at step 52, the false positive rate Fp is updated. If the attack is confirmed afterwards (step 53), the false positive rate is revised (step 54). Then at step 55 the prediction confidence level is updated based on the false positive rate Fp and false negative rate Fn for the related attack type.

If the attack is confirmed afterwards (step 53), an update of the inference rules B is triggered at step 56.

Figure 6:
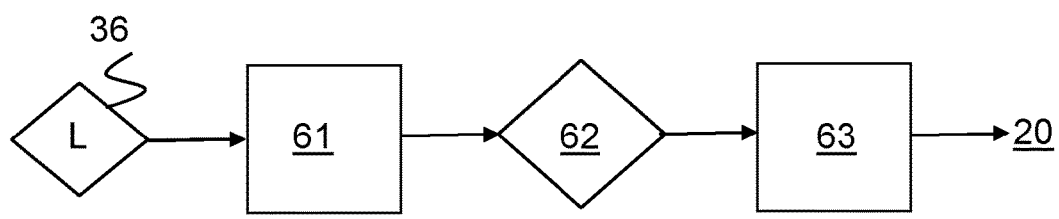
FIG. 6 is a flowchart of an exemplary embodiment of determining a prediction confidence level for use in a device or method for generating a response to an attack in a communication network.

As disclosed in relation to FIG. 6, the confidence level is also used for triggering training of the prediction model C during exploitation. When at step 36 the prediction confidence level is found to be unsatisfactory, then at step 61 the collected data logs are stored in a database in the device. At step 62, the size of the database is checked. When it reaches a sufficient size, training of the graph neural network GNN is triggered at 63 with the data logs stored in the database. These data logs are new compared to those used for previous training. This allows to update the prediction model C and increase the performance of the prediction.

Figure 7:
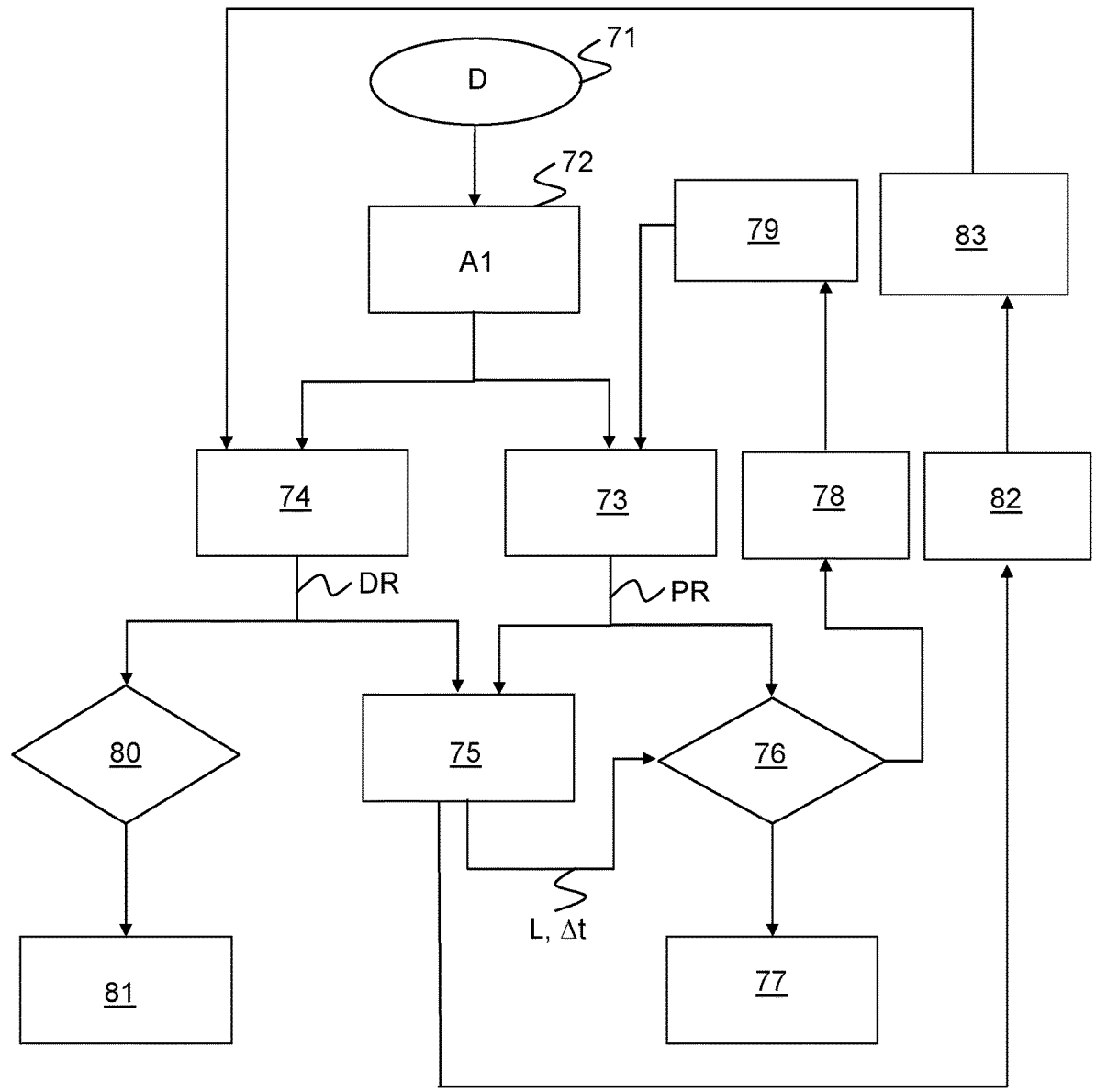
FIG. 7 is a block diagram illustrating an overview of the disclosed method and device in exploitation.

FIG. 7 is a block diagram providing an overview of the disclosed method and device in exploitation. Network data D are received at 71. An instantiation module 72 generates a network data graph A1 based on the received network data and the schema A. The network data graph A1 is provided to a prediction module 73 and to a detection module 74. The prediction module 73 outputs a prediction result PR. The detection module outputs a detection result DR. The prediction result PR and the detection result DR are provided to a consistency checking module 75.

The consistency checking module outputs a prediction confidence level L and a time interval Δt between the prediction and the detection. Based on the confidence level and the time interval, a decision is made at 76 to launch a proactive attack response when an attack was predicted. The proactive attack response is launched at 77.

If at 76 the prediction confidence level L is found unsatisfactory, an enhancement of the prediction module 73 is triggered: at 78, collected data logs are stored in a database in the device, and at 79, when the size of the database is large enough to allow for training, training of the graph neural network is triggered.

Similarly, when the consistency checking module 75 identifies a confirmed attack which was predicted and not detected, an enhancement of the detection module 74 is triggered: at 82, the data logs leading to the prediction result PR are captured as a new attack type and analyzed and at 83 an update of the inference rules B is triggered with the new attack type.

When an attack was detected by the detection module 74, a check is done at 80 whether a proactive attack response has already been launched. If not, a reactive attack response is launched at 81.

The disclosed device and method combine detection and prediction functions to enable an automated and self-optimizing identification of security attacks, as early as possible, and, as a response to such identification, perform the appropriate actions either in reactive or proactive mode, depending on a degree of confidence estimated on the prediction function and an estimated efficiency of the proactive action.

Once correctly trained the graph neural network GNN of the prediction module 73 is able to classify the data logs to identify attacks at least as efficiently as the detection module 74, and faster by recognizing attacks which are very similar to known attacks but wouldn't have been recognized by the detection module 74.

When attacks are identified late in the execution phase of the attack or even after the damage has already occurred in the network, the corresponding data logs are stored in a database of the device. When a sufficient amount of collected data is reached, training of the prediction module is triggered to update the prediction model C. In this manner, the trained model is tailored to the context and achieves high prediction accuracy.

Figure 8:
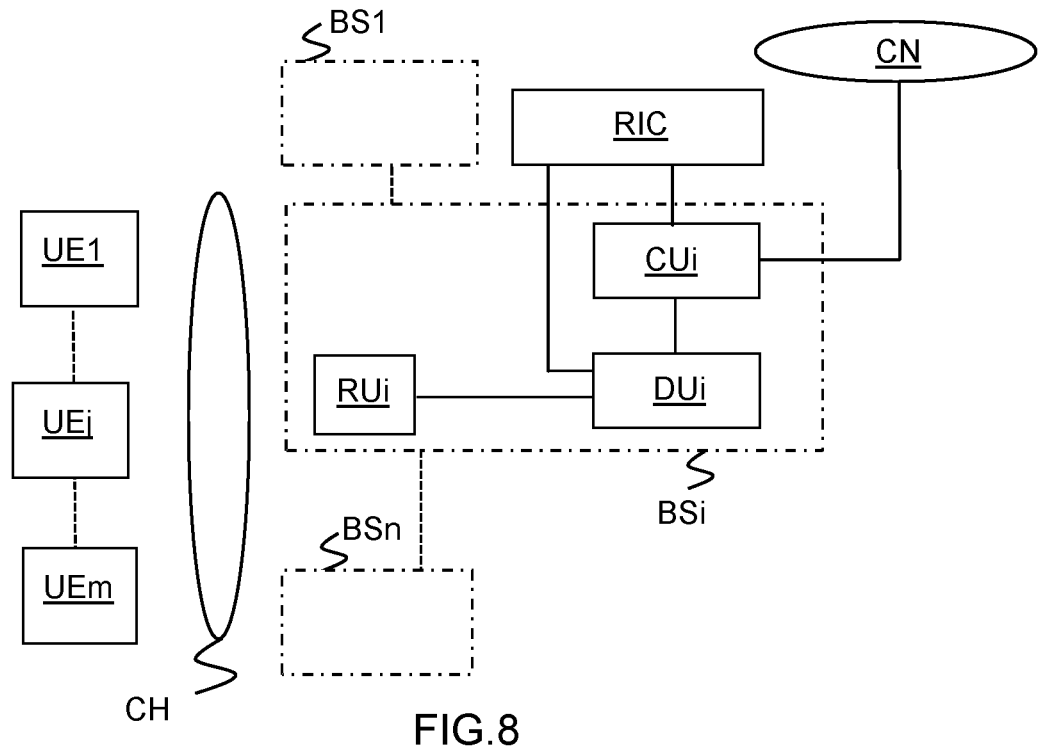
FIG. 8 is a schematic representation of a communication network including a device for generating a response to an attack in the communication network.

FIG. 8 illustrates a communication network including a device for generating a response to an attack. In the example of FIG. 8 the communication network is a 5G mobile communication network. It comprises a plurality of base stations BSi (i=1, . . . , n) to communicate over a radio channel CH with user equipment UEj (=1, . . . , m). In the example of FIG. 8 the base stations comprise a radio head unit RUi, a distributed processing unit DUi and a central processing unit CUi. The central processing unit CUi is connected to a core network CN. The base stations BSi are connected to an intelligent controller RIC (where RIC stands for RAN intelligent controller and RAN stands for Radio Access Network). For simplicity only base station BSi is represented in details in FIG. 8 with the connections to the core network CN and to the intelligent controller RIC. Although not represented in FIG. 8 the same applies to the other base stations BS1 to BSn. In the embodiment of FIG. 8, the disclosed device and method are implemented in the intelligent controller RIC. In an embodiment, during the configuration phase the RIC is trained with training data collected by the base station. In exploitation, 5G data logs are collected by the RIC from one or more base stations in the network area.

Implementing the disclosed device and method in the intelligent controller RIC has at least two advantages. It takes the additional operations and related computational efforts outside of the RAN thereby reducing deployment costs. And it makes use of the existing interfaces between RAN and RIC to transfer the data logs from several base stations BSi and send back the attack response.

The disclosed device and method allow automated and self-optimizing identification of security attacks and therefore are particularly efficient in an environment with different contexts, deployment scenarios and large amount of possible attack types like the 5G environment. The disclosed device and method are tailored for each base station and run on existing 5G event logs.

Figure 9:
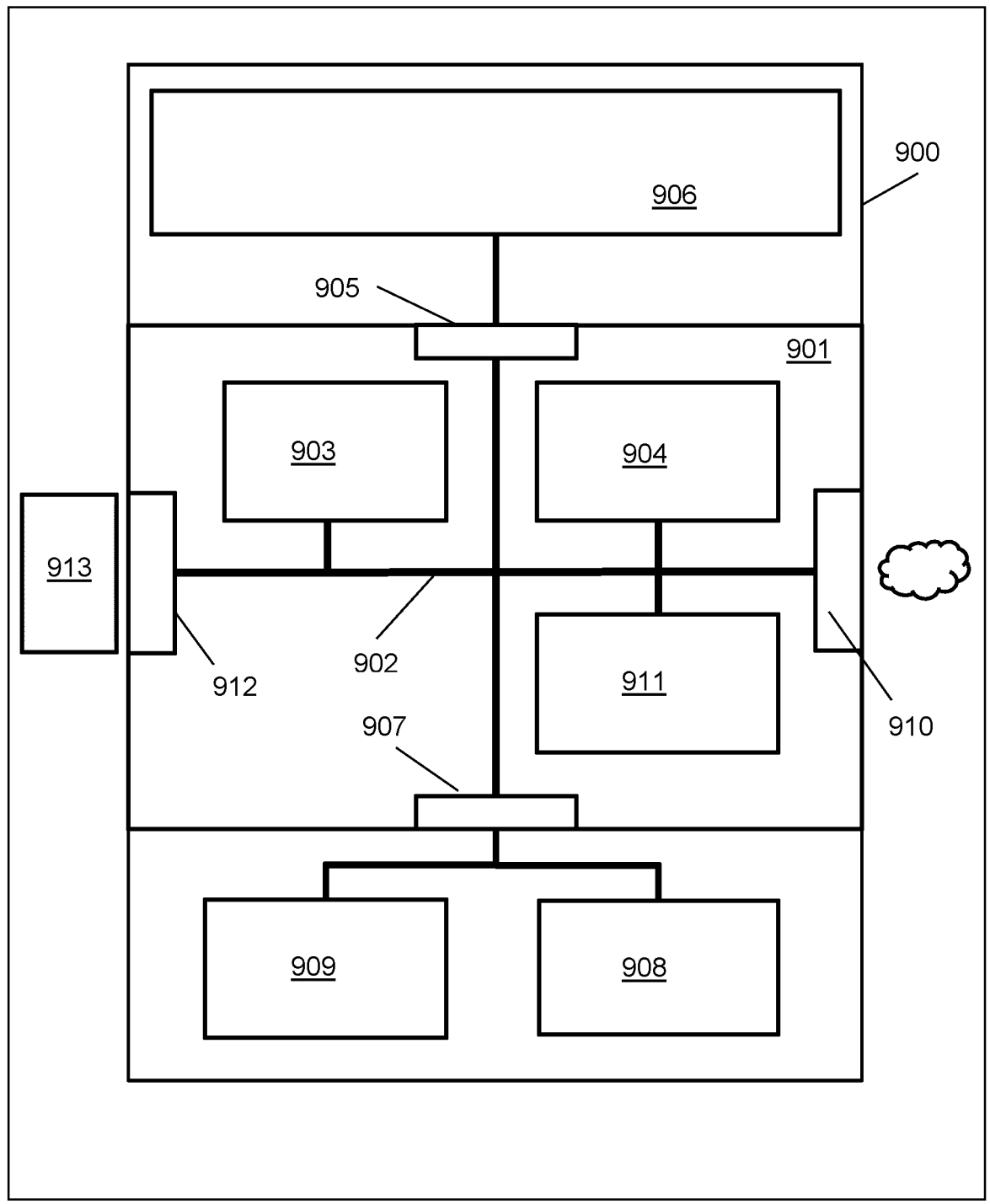
FIG. 9 is a schematic representation of a device for generating a response to an attack in a communication network.

FIG. 9 is a block diagram of a device 900 for generating a response to an attack in a communication network, according to an exemplary embodiment. The device of FIG. 9 can be used in the RIC as described in relation to FIG. 8.

The device 900 comprises a printed circuit board 901 on which a communication bus 902 connects a processor 903, a random access memory 904, a storage medium 911, an interface 905 for connecting a display 906, a series of connectors 907 for connecting user interface modules such as a mouse or trackpad 908 and a keyboard 909, a wireless network interface 910, a wired network interface 912 and a detachable storage medium 913. Depending on the functionality required, the device may implement only part of the above. Certain modules of FIG. 9 may be internal or connected externally, in which case they do not necessarily form integral part of the device itself. E.g. display 906 may be a display that is connected to a device only under specific circumstances, or the device may be controlled through another device with a display, i.e. no specific display 906 and interface 905 are required for such a device. Memory 991 contains software code which, when executed by processor 903, causes the device to perform the methods described herein. In particular it contains the software code to implement the graph neural network used by the prediction module 73. Storage medium 911 host databases storing data logs as disclosed above in relation to FIGS. 6 and 7, as well as the schema A and the inference rules B. The storage medium 913 is a detachable device such as a USB stick. For example it can hold software code to be uploaded to memory 911.

It should be appreciated by those skilled in the art that any block diagrams herein represent conceptual views of illustrative circuitry embodying the principles of the disclosure. Similarly, it will be appreciated that any flow charts, flow diagrams, state transition diagrams, and the like represent various processes which may be substantially implemented by circuitry.

Each described function, engine, block, step can be implemented in hardware, software, firmware, middleware, microcode, or any suitable combination thereof. If implemented in software, the functions, engines, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable processing apparatus, create the means for implementing the functions described herein.

In the present description, functional blocks representing means denoted as "configured to perform . . . " (a certain function) shall be understood as functional blocks comprising circuitry that is adapted for performing or configured to perform a certain function. A means being configured to perform a certain function does, hence, not imply that such means necessarily is performing said function (at a given time instant). Moreover, any functional blocks representing an entity configured to perform a function, may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may be any physical media that can be read, written or more generally accessed by a computer/a processing device. Examples of computer storage media include, but are not limited to, a flash drive or other flash memory devices (e.g. memory keys, memory sticks, USB key drive), CD-ROM or other optical storage, DVD, magnetic disk storage or other magnetic storage devices, solid state memory, memory chip, RAM, ROM, EEPROM, smart cards, a relational database management system, a traditional database, or any other suitable medium that can be used to carry or store program code in the form of instructions or data structures which can be read by a computer processor. Also, various forms of computer-readable medium may be used to transmit or carry instructions to a computer, including a router, gateway, server, or other transmission device, wired (coaxial cable, fiber, twisted pair, DSL cable) or wireless (infrared, radio, cellular, microwave). The instructions may include code from any computer-programming language, including, but not limited to, assembly, C, C++, Basic, SQL, MySQL, HTML, PHP, Python, Java, Javascript, etc. Embodiments of a computer-readable medium include, but are not limited to, both computer storage media and communication media including any medium that facilitates transfer of a computer program from one place to another. Specifically, program instructions or computer readable program code to perform embodiments described herein may be stored, temporarily or permanently, in whole or in part, on a non-transitory computer readable medium of a local or remote storage device including one or more storage media.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). Terminology derived from the word "indicating" (e.g., "indicates", "indicator" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/ information being indicated, and the conveyance of some symbol representing the object/information being indicated.

According to example embodiments, network elements, network devices, data servers, network resource controllers, network apparatuses, clients, routers, gateways, network nodes, computers, cloud-based servers, web servers, application servers, proxies or proxy servers, or the like, may be (or include) hardware, firmware, hardware executing software or any combination thereof. Such hardware may include processing or control circuitry such as, but not limited to, one or more processors, one or more CPUs, one or more integrated circuits one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

The invention claimed is:

1. A device for generating a response to an attack in a communication network, comprising: at least one processor; and
at least one non-transitory memory storing instructions that, when executed with the at least one processor, cause the device at least to:
generate a graph representation of network data received from the communication network, based on a predefined schema,
predict attacks from the received data based on the graph representation with using a graph neural network trained with subgraphs representing candidate attacks,
detect attacks from the received data with applying inference rules to the graph representation, and launch an attack response upon prediction of an attack or upon detection of an attack;
wherein the instructions, when executed with the at least one processor, cause the device to obtain a prediction confidence level with comparing the result of predicting the attack and the result of detecting the attack, wherein the attack response is launched upon prediction of an attack depending on the prediction confidence level and
cause the device to determine a time difference between predicting the attack and detecting the attack, wherein the attack response is launched upon prediction of an attack depending on said time difference.

2. A device as claimed in claim 1, wherein the instructions, when executed with the at least one processor, cause the device to train the graph neural network.

3. A device as claimed in claim 1, wherein the instructions, when executed with the at least one processor, cause the device to trigger training of the graph neural network based on the prediction confidence level.

4. A device as claimed in claim 1, wherein the instructions, when executed with the at least one processor, cause the device to trigger an update of the inference rules when a confirmed attack was predicted and was not detected.

5. A device as claimed in claim 1, wherein the subgraphs used for training the graph neural network are obtained with the instructions, when executed with the at least one processor, causing the device to query a graph representation of training data wherein the training data include attacks and the graph representation of training data is generated based on the predefined schema.

6. A device as claimed in claim 1, wherein the instructions, when executed with the at least one processor, cause the device to infer presence of a type of attack in the graph representation and different prediction confidence levels are obtained for different types of attacks.

7. A device as claimed in claim 1, wherein the graph neural network is a convolutional graph neural network.

8. The device as claimed in claim 1, includes a radio intelligent controller in a radio access network wherein the network data are received from at least one base station in a core network.

9. A method for generating a response to an attack in a communication network, comprising:
generating a graph representation of network data received from the communication network, based on a predefined schema,
predicting attacks from the received data based on the graph representation with using a graph neural network trained with subgraphs representing candidate attacks,
detecting attacks from the received data with applying inference rules to the graph representation,
launching an attack response upon prediction of an attack or upon detection of an attack, obtaining a prediction confidence level with comparing the result of predicting the attack and the result of detecting the attack, wherein the attack response is launched upon prediction of an attack depending on the prediction confidence level and
cause the device to infer presence of a type of attack in the graph representation and different time differences are obtained for different types of attacks.

10. A method as claimed in claim 9, further comprising triggering training of the graph neural network based on the prediction confidence level.

11. A method as claimed in claim 9, further comprising triggering an update of the inference rules when a confirmed attack was predicted and was not detected.

12. A method as claimed in claim 9, further comprising determining a time difference between predicting the attack and detecting the attack, wherein the attack response is launched upon prediction of an attack depending on said time difference.

13. A non-transitory computer readable medium comprising a program of instructions that, when executed by an apparatus, carry out the method as claimed in claim 9.

\* \* \* \* \*